United States Patent [19]

Halpaap et al.

[11] Patent Number: 4,530,990

[45] Date of Patent: Jul. 23, 1985

[54] PROCESS FOR THE PREPARATION OF VISCOSITY STABLE POLYURETHANE SOLUTIONS

[75] Inventors: Reinhard Halpaap; Josef Pedain, both of Cologne; Wilhelm Thoma, Leverkusen; Jürgen Grammel, Cologne, all of Fed. Rep. of Germany

[73] Assignee: Bayer Aktiengesellschaft, Leverkusen, Fed. Rep. of Germany

[21] Appl. No.: 433,596

[22] Filed: Oct. 8, 1982

[30] Foreign Application Priority Data

Oct. 28, 1981 [DE] Fed. Rep. of Germany ....... 3142706

[51] Int. Cl.³ .................... C08G 2/28; C08G 18/08
[52] U.S. Cl. ...................... 528/53; 528/67; 528/85; 528/225
[58] Field of Search ............ 521/53, 95, 128; 528/52, 53, 67, 85, 224, 492, 85; 564/253, 258

[56] References Cited

U.S. PATENT DOCUMENTS

| | | | |
|---|---|---|---|
| 3,377,308 | 4/1968 | Oertel et al. | 260/32.6 |
| 3,483,167 | 12/1969 | Sommer et al. | 260/75 |
| 3,723,372 | 3/1973 | Wakimoto et al. | 260/29.1 R |
| 4,280,944 | 7/1981 | Saito et al. | 528/67 |
| 4,324,879 | 4/1982 | Bock et al. | 528/52 |

FOREIGN PATENT DOCUMENTS

| | | | |
|---|---|---|---|
| 888781 | 12/1971 | Canada | 528/67 |
| 2500921 | 1/1980 | Fed. Rep. of Germany . | |
| 1438145 | 6/1976 | United Kingdom . | |

*Primary Examiner*—John Kight
*Assistant Examiner*—Kriellion Morgan
*Attorney, Agent, or Firm*—Gene Harsh; Joseph C. Gil; Thomas W. Roy

[57] ABSTRACT

A process is described for the preparation of predominantly linear polyurethane solutions which comprises
(a) reacting
    (A) an organic diisocyanate or diisocyanate mixture optionally containing small portions of a triisocyanate with
    (B) one or more polyhydroxyl compounds which are predominantly bifunctional and generally have molecular weights of from about 400 to 5000 and
    (C) optionally one or more chain lengthening agents having at least two isocyanate reactive hydrogen atoms and molecular weights of from about 32 to 399,
wherein the proportion of isocyanate groups to the number of isocyanate-reactive hydrogen atoms is in the range of from about 0.9:1 to 1:0.9, and
(b) when the polyurethane formed has reached the required viscosity, adding a monofunctional, low molecular weight oxime having a molecular weight of from about 73 to 325, preferably butanone oxime, to the reaction mixture as chain breaking agent in a quantity equivalent to or in excess of the equivalents of unreacted isocyanate groups.

The new chain breaking agents are simple compounds which effect rapid chain breaking and have no undesirable side effects as regards subsequent breakdown of the chains and even enable further synthesizing reactions to be carried out if desired, for example with diamines.

5 Claims, No Drawings

PROCESS FOR THE PREPARATION OF VISCOSITY STABLE POLYURETHANE SOLUTIONS

BACKGROUND OF THE INVENTION

1. Field of the Invention

This invention relates to a process for adjusting the viscosities to specified values in the preparation of storage stable polyurethane solutions by a chain breaking reaction with relatively high molecular weight polyurethanes, using small quantities of low molecular weight monooximes

2. Description of the Prior Art

The preparation of polyurethane solutions from organic polyisocyanates and organic compounds containing polyfunctionally mobile hydrogen atoms has long been known in the art. If the polyisocyanates and polyols are used in approximately equivalent quantities, it is often difficult to obtain polyurethane solutions with reproducible specific physical properties, in particular a constant viscosity. The critical range lies approximately at NCO/OH ratios of from 0.9:1 to 1:0.9. Small fluctuations in the NCO/OH ratio, which are unavoidable in large scale productions, result in widely differing polyurethanes. The physical properties of the polyurethane solutions are drastically altered by the wide fluctuations in the proportion of highly cross-linked particles occurring under these conditions.

With a view to obtaining products which are as far as possible uniform and reproducible in quality, methods have been developed for rapidly breaking off the urethanization reaction when the desired viscosity, i.e. the desired degree of polymerization and cross-linking, has been reached.

It is known that the polyaddition reaction can be terminated by chain breaking by the addition of monofunctional compounds such as alcohols or primary and secondary amines containing mobile hydrogen atoms which react with the free isocyanate groups.

According to a process disclosed in Canadian Pat. No. 888,781, a primary alcohol is added to break off the polyaddition reaction. In German Offenlegungsschrift No. 2,323,393, it is proposed to add a sterically hindered secondary alcohol to the reaction mixture from the beginning in order to prevent both premature chain breaking and excessive cross-linking of the polyurethane.

According to German Auslegeschrift No. 1,157,386, polyurethane solutions containing hydrazide end groups are further chain lengthened to the desired viscosity by means of a subequivalent quantity of less highly reactive polyisocyanates. Chain breaking is carried out by a reaction with monofunctional isocyanates or with acylating agents.

According to the state of the art, the polyaddition reaction between polyisocyanate and polyol may also be terminated advantageously and very rapidly by chain breaking by the addition of an excess of monofunctional amine which reacts preferentially with the isocyanate groups still present. However, since excess amine subsequently causes random breakdown of the chains and lowering of the viscosity due to partial saponification of the ester functions, methods have been developed for retaining the advantage of rapid chain breaking with the amine but removing the amine excess from the reaction mixture by subsequent reactions.

According to German Offenlegungsschrift No. 2,500,921, monoisocyanates are suitable for the same purpose. According to this proposal, it is part of the art to terminate the polyaddition reaction with excess monoamine when the desired viscosity has been reached. This excess of monoamine is in turn bound by the addition of a monoisocyanate, with the result that viscosity stable polyurethane solutions are obtained.

All the methods mentioned above have serious disadvantages. Breaking of the polyaddition reaction with monofunctional alcohols proceeds slowly. The competing reactions of the monofunctional and bifunctional hydroxyl components proceed side by side so that effective chain breaking requires a very large excess of alcohol. Such a large alcohol excess is, however, just as disadvantageous to the viscosity stability of the polymer solution as an amine excess since it causes solvolytic breakdown reactions at the ester groups.

The subsequent additional chain lengthening with less reactive diisocyanates described above requires excessively long reaction times which are not tolerable for practical purposes. The subsequent chain breaking by the reaction with monofunctional compounds is as complicated a procedure as the method of chain breaking with amines followed by reaction with monoisocyanates since excess functional groups must repeatedly be bound by an excess of new reagents. Moreover, the low molecular weight ureas produced in this process may seriously interfere with subsequent use of the product if the difficultly soluble compounds separate as a heterogeneous deposit on the surface of the polyurethane, e.g., in the case of a polyurethane coating, so that the process becomes inapplicable for the purpose.

The present invention describes a process which does not have the above-described disadvantages of the known processes and enables polyurethane solutions to be prepared with specified, reproducible properties in which the viscosity can at any time be adjusted to the required value. It has surprisingly been found that this object can be achieved by the addition of a simple low molecular weight organic compound to the reaction mixture of polyhydroxyl compounds and polyisocyanates. The method, which is distinguished by its simplicity, enables the polyaddition reaction to be broken off at any time, e.g. after the desired viscosity has been reached. The compound used reacts specifically with excess isocyanate groups, removes them from the reaction mixture and thus stops the polyaddition reaction. An excess of the substance does not cause any trouble since it behaves inertly like a solvent.

SUMMARY OF THE INVENTION

The present invention is directed to a process for the preparation of predominantly linear polyurethanes in solution which comprises (a) reacting
- (A) an organic diisocyanate or diisocyanate mixture optionally containing small proportions of a triisocyanate with
- (B) one or more polyhydroxyl compounds which are predominantly bifunctional, generally with molecular weights of from about 400 to 5000 and
- (C) optionally one or more chain lengthening agents containing at least two isocyanate reactive hydrogen atoms and having molecular weights of from about 32 to 399, wherein the ratio of isocyanate groups to the number of isocyanate reactive hydrogen atoms lies in the range of from about 0.9:1 to 1:0.9, and (b) when the required viscosity has been reached or the polyurethanes have been built up to a sufficiently high molecular weight state, adding a monofunctional, low molecular weight oxime having a molecular weight of from about 73 to 325 to the reaction mixture as chain breaking agent in a quantity equivalent to or in excess of the equivalents of unreacted isocyanate groups.

DETAILED DESCRIPTION OF THE INVENTION

The process according to the invention avoids the disadvantages of the hitherto known processes. It is distinguished by the rapidity with which chain breaking is achieved with a simple organic compound which in contrast to the hitherto known reagents has no adverse side effects causing subsequent chain breakdown and lowering of viscosity.

The process according to the invention enables polyurethanes of a given composition and concentration to be prepared reproducibly and with the same viscosity, with a scatter of at the most about ±10%, in most cases less than or equal to ±5%. The process according to the invention has the further advantage that after termination of the polyaddition reaction by means of the oxime, the reaction may if desired be continued (at a higher temperature) and may then again be terminated with oxime. This has not been possible with the known chain breaking reagents, at least not under practical conditions.

Subsequent additional cross-linking of the polyurethanes obtained is also advantageous for many purposes and can easily be achieved with the process according to the invention. The excess isocyanate groups continue to be present in a latent form as a result of the reaction with the oxime and may be made to react by known methods of thermal deblocking if necessary, e.g., with aliphatic polyamines at slightly elevated temperatures.

Since the polyaddition reaction may be terminated at any stage, it is possible by the process according to the invention to obtain polyurethanes having the same composition but very different chain lengths and consequently different properties. Solutions at concentrations, for example, of about 10 to 50% may in principle be prepared with any viscosities within the range of, for example, about 500 to 80,000 mPas. The reaction products obtained are high molecular weight polyurethanes containing small quantities of specially blocked end groups.

The chain breaking agents used according to the invention are lower aliphatic, cycloaliphatic or araliphatic monooximes having molecular weights of from about 73 to 325, preferably from about 73 to 141; for example, acetone oxime, butanone oxime, 3-methyl-butanone oxime, 3,3-dimethyl-butanone oxime, 2- and 3-pentanone oxime, 4-methyl-2-pentanone oxime, cyclopentanone oxime, 2,2,4- or 2,4,4-trimethylcyclopentanone oxime, cyclohexanone oxime and acetophenone oxime. Butanone oxime is preferred.

It is found to be advantageous if on reaching the desired viscosity the polyurethane solution contains less than about 0.4% by weight, preferably less than about 0.25% by weight, most preferably less than about 0.15% by weight of NCO, i.e. of unreacted isocyanate groups. Termination of the polyaddition reaction by chain breaking requires the use of at least the equivalent quantity of monooxime although an excess of monooxime is generally added. The quantities required for chain breaking are generally from about 0.05 to 2% by weight of oxime, based on the solid content, preferably from about 0.08 to 1% by weight. Excess reagent is not harmful and simply behaves like a solvent.

The starting materials used for the polyurethane solutions prepared by the process described above are the usual polyisocyanates, polyhydroxyl compounds and chain lengthening agents. The conventional organic solvents of polyurethane chemistry are used.

The conventional polyisocyanates are suitable for the process according to the invention. The polyisocyanates used as starting components may be aliphatic, cycloaliphatic, araliphatic, aromatic and heterocyclic polyisocyanates having an isocyanate functionality of from 2 to 4, preferably 2, as described, for example, by W. Siefken, Liebigs Ann. Chem. 562, 75 (1948). The isocyanates contain an aliphatic hydrocarbon group having 2 to 18, preferably 6 to 10 C-atoms, a cycloaliphatic hydrocarbon group having 4 to 15, preferably 5 to 10 C-atoms, an aromatic hydrocarbon group having 6 to 15, preferably 6 to 13 C-atoms, the aromatic or cycloaliphatic rings being optionally substituted with alkyl groups, preferably up to 4 alkyl groups each having 1 to 4 C-atoms; or an araliphatic hydrocarbon group having 8 to 15, preferably 8 to 13 C-atoms. The following are examples: 1,4-tetramethylene diisocyanate, 1,6-hexamethylene diisocyanate, 1,12-dodecanediisocyanate, cyclobutane-1,3-diisocyanate, cyclohexane-1,3- and -1,4-diisocyanate, 1-isocyanato-3,3,5-trimethyl-5-isocyanatomethylcyclohexane, 2,4- and 2,6-hexahydrotolylenediisocyanate, hexahydro-1,3- and -1,4-phenylenediisocyanate, 3,3',5,5'-tetraethyl-dicyclohexylmethane-4,4'-diisocyanate, 3,3'-dimethyl-dicyclohexylmethane-4,4'-diisocyanate, perhydro-2,4'- and 4,4'-diphenylmethane-diisocyanate, 1,3- and 1,4-phenylenediisocyanate, 2,4- and 2,6-tolylenediisocyanate, diphenylmethane-2,4'- and/or 4,4'-diisocyanate, naphthylene-1,5-diisocyanate and, in the case of isomeric compounds, any mixtures of these isomers (or of their conformers in the case of cycloaliphatic compounds).

Small proportions, up to about 5 mole percent, of higher functional isocyanates may also be added; e.g., benzene-1,3,5-triisocyanate, triphenylmethane-4,4',4"-triisocyanate, polyphenylpolymethylene polyisocyanates such as those described in British Pat. Nos. 874,430 and 848,671, polyisocyanates containing biuret groups as described, e.g., in U.S. Pat. Nos. 3,124,605 and 3,201,372 and in British Pat. No. 889,050, and polyisocyanates containing isocyanurate groups as described, e.g., in U.S. Pat. No. 3,001,973, German Pat. Nos. 1,022,789, 1,222,067 and 1,027,394 and in German Offenlegungsschriften Nos. 1,929,034 and 2,004,048.

The following isocyanates may also be used in the process according to the invention: 3- and 4-isocyanatophenyl-sulphonyl isocyanates according to U.S. Pat. No. 3,454,606; perchlorinated aryl polyisocyanates as described, e.g., in German Auslegeschrift No. 1,157,601 (U.S. Pat. No. 3,277,138); polyisocyanates containing carbodiimide groups as described in German Pat. No. 1,092,007 (U.S. Pat. No. 3,152,162) and in German Offenlegungsschriften Nos. 2,504,400, 2,537,685 and 2,552,350; norbornane diisocyanates according to U.S. Pat. No. 3,492,330; polyisocyanates containing allophanate groups as described, e.g., in British Pat. No.

994,890, Belgian Pat. No. 761,626 and Netherlands Patent Application No. 7,102,524; polyisocyanates containing urethane groups as described, e.g., in Belgian Pat. No. 752,261 or in U.S. Pat. Nos. 3,394,164 and 3,644,457; polyisocyanates containing acylated urea groups according to German Pat. No. 1,230,778; polyisocyanates prepared by telomerization reactions as described, e.g., in U.S. Pat. No. 3,654,106; polyisocyanates containing ester groups such as those mentioned, e.g., in British Pat. Nos. 965,474 and 1,072,956, U.S. Pat. No. 3,567,763 and German Pat. No. 1,231,688; reaction products of the above-mentioned isocyanates with acetals according to German Pat. No. 1,072,385; and polyisocyanates containing polymeric fatty acid esters according to U.S. Pat. No. 3,455,883.

Preferred polyisocyanates are the commercially readily available compounds such as p-phenylene diisocyanate, diphenylmethane-4,4'-diisocyanate, tolylene diisocyanate, naphthalene-1,5-diisocyanate, isophorone diisocyanate, hexamethylene diisocyanate and trimethylhexamethylene diisocyanate.

Suitable polyhydroxyl compounds include polyesters, polyester amides, polyethers, polyacetals and polycarbonates such as those conventionally used for the preparation of polyurethanes. It is preferred to use compounds having two hydroxyl groups per molecule with an average molecular weight of from about 400 to 5000, preferably from about 800 to 3000.

Suitable hydroxyl polyesters for the process according to the invention include reaction products of polyhydric, preferably dihydric alcohols with the optional addition of trihydric alcohols, and polybasic, preferably dibasic carboxylic acids. Instead of free polycarboxylic acids, the corresponding polycarboxylic acid anhydrides or polycarboxylic acid esters of lower alcohols or mixtures thereof may be used for the preparation of the polyesters. The polycarboxylic acids may be aliphatic, cycloaliphatic, aromatic or heterocyclic. Suitable polyesters have been described, for example, in Houben-Wehl-Müller, XIV/2, pages 12,29, Thieme, Stuttgart, 1963.

The following are examples of such carboxylic acids and derivatives thereof: oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, diethylsuccinic acid and 1,4-cyclohexane-dicarboxylic acid.

Suitable alcohol components include, for example, ethylene glycol, diethylene glycol, triethylene glycol, 1,2- and 1,3-propanediol, 1,4-,2,3-, 1,2 and 1,3-butanediol, 1,5-pentanediol, 1,6-hexanediol, 1,8-octanediol, neopentyl glycol, 1,4-bis-(hydroxymethyl)-cyclohexane and 2-methyl-1,3-propanediol. Higher functional polyols such as, for example, glycerol, trimethylolpropane, 1,2,6-hexanetriol, 1,2,4-butanetriol, pentaerythritol or sorbitol may also be used in minor quantities, up to about 5 mole percent. Unsaturated fatty acid polyesters containing a proportion of double or triple bonds and polyesters of lactones such as ε-caprolactone or of hydroxycarboxylic acids such as ω-hydroxycaproic acid may also be used.

Suitable polyester amides for the process described are obtained by replacing a proportion of the dihydric alcohol of the polyester by amino alcohols, diamines or polyamines. Ethanolamine and ethylenediamine are preferred.

According to the invention, the relatively high molecular weight polyhydroxyl compounds may also be linear or slightly branched polyethers preferably having 2 to 3 hydroxyl groups, e.g., addition products of alkylene oxides and starter compounds. Suitable alkylene oxides include, for example, ethylene oxide, propylene oxide, butylene oxide, tetrahydrofuran, styrene oxide and epihalogenhydrins. Compounds having mobile hydrogen atoms may be used as starter components, such as water, alcohols, ammonia or amines, e.g., ethylene glycol, 1,2- and 1,3-propylene glycol, trimethylolpropane, glycerol, sorbitol, formitol mixtures, 2,2-bis-(4-hydroxyphenyl)-propane, aniline, ethanolamine and ethylene diamine.

Polyacetals may also be used as polyhydroxyl compounds, e.g., the compounds obtained by the condensation of formaldehyde or some other aldehyde with polyhydric alcohols of the type described. The known types of polycarbonates which may be prepared, for example, from diols, e.g., with diphenyl carbonate or phosgene, are also suitable.

Low molecular weight chain lengthening agents which contain mobile hydrogen atoms, are at least bifunctional in their reaction with isocyanates and have molecular weights of from about 32 to 399 may be used in addition to the relatively high molecular weight polyhydroxyl compounds described. The low molecular weight compounds used for this purpose are preferably low molecular weight diols, amino alcohols or diamines.

Examples of suitable chain lengthening agents for the purpose of this invention include ethylene glycol, 1,2- and 1,3-propanediol, 1,4- and 1,3-butanediol, 1,5-pentanediol, 1,6-hexanediol, 1,8-octanediol, neopentyl glycol, 1,4-bis-(hydroxymethyl)-cyclohexane, 2-methyl-1,3-propanediol, diethyleneglycol, triethyleneglycol, tetraethyleneglycol, dipropyleneglycol, 4,4'-dihydroxydiphenyl-propane, ethanolamine, diethanolamine, N-methyl-diethanolamine and 3-aminopropanol. The following are also suitable: ethylene diamine, 1,4-tetramethylene diamine, 1,11-undecamethylenediamine, 1,12-dodecamethylenediamine, 1-amino-3-aminomethyl-3,5,5-trimethylcyclohexane, 2,4- and 2,6-hexahydrotolylenediamine, 2,4'- and 4,4'-diaminodicyclohexylmethane, 1-amino-2-aminomethyl-3,3,5- or -3,5,5-trimethylcyclopentane, tolylene-diamine, p-xylenediamine, 4,4'-diaminodiphenylmethane, hydrazine, methylhydrazine, N,N'-dimethylhydrazine and their homologues.

Comprehensive examples of these starting materials according to the invention (polyisocyanates, relatively high molecular weight polyhydroxyl compounds, low molecular weight chain lengthening agents and the optional catalysts, auxiliary agents and additives) are given in German Auslegeschrift No. 2,854,384 and U.S. Pat. No. 4,331,778, incorporated herein by reference.

The polyurethane solutions prepared by the process according to the invention may be used in numerous fields of application. They are preferably employed for products requiring exact reproducibility of their properties. They are particularly suitable for the production of coatings, films and lacquers.

Preparation of the polyurethane solutions by the process according to the invention is preferably carried out by adding the polyisocyanates to the solution of relatively high molecular weight polyols and low molecular weight chain lengthening agents in a portion of the solvent. As the reaction progresses and the viscosity increases, the mixture may be diluted portionwise until the required final concentration is obtained. The reaction temperatures are in the region of from about 30° to 130° C., preferably from about 50° to 100° C. Increases in the chain length and in the viscosity may optionally be obtained by subsequent addition of small quantities of the polyisocyanate.

Alternatively, a two-stage reaction may be carried out in which the relatively high molecular weight polyols are first reacted with the diisocyanates in a portion of the solvent. The polymer chain is subsequently lengthened and the viscosity increased by the addition of the above-mentioned low molecular weight chain lengthening agents. The reaction mixture may then be diluted to the required final concentration as described.

When the required final concentration is reached, the reaction according to the invention is stopped. The desired final viscosities at room temperature and concentrations of about 20 to 40% by weight are in the region of about 1000 to 100,000 mPas. Concentrations of from about 25 to 40% by weight and viscosities of from about 5000 to 80,000 mPas are preferred.

Parts and percentages indicated in the examples are parts by weight and percentages by weight. Molar data of the polyhydroxyl compounds relate to average molecular weights and OH numbers.

Abbreviations used:
DMF = dimethylformamide
MEK = methyl ethyl ketone
T = toluene.

EXAMPLE 1

2250 parts (1.0 mol) of a hydroxypolyester of adipic acid and butanediol-1'4 having an average molecular weight of 2250, 283 parts (4.56 mol) of ethanediol and 22 parts (0.24 mol) of 1,4-butanediol are reacted with 1452 parts (5.8 mol) of 4,4'-diisocyanatodiphenylmethane in 7441 parts of a mixture of DMF/MEK/T (60:25:15). When the solution has reached a viscosity of approximately 12,000 mPas at 80° C. and an isocyanate content of below 0.1%, 24 parts of butanone oxime are added and the mixture is stirred for approximately one hour at 80° C. A polyurethane solution having a viscosity of 36,000 mPas/23° C. is obtained. No change in viscosity has occurred after 10 days storage at room temperature.

EXAMPLE 2

2250 parts (1.0 mol) of the same polyester as in Example 1 and 216 parts (2.4 mol) of 1,4-butanediol are reacted with 851 parts (3.4 mol) of 4,4'-diisocyanatodiphenylmethane to produce a polyurethane solution in 4976 parts of DMF/toluene (3:2). An approximate viscosity of 17,000 mPas is obtained at 80° C. and the polyaddition reaction is stopped with 50 parts of butanone oxime. A 40% solution having a viscosity of 46,000 mPas/23° C. is obtained. After 20 days at room temperature, the viscosity is found to be 46,500 mPas/23° C. and is thus virtually unchanged.

EXAMPLE 3

A solution of 2000 parts (1.0 mol) of a linear propylene oxide polyether started with 1,2-propanediol and having an average molecular weight of 2000 is reacted with 676 parts (2.7 mol) of 4,4'-diisocyanatodiphenylmethane in 400 parts of DMF. The prepolymer obtained is reacted with 150 parts (0.05 mol) of a trifunctional propylene oxide polyether started with trimethylolpropane and having an average molecular weight of 3000 and with 153 parts (1.7 mol) of 1,4-butanediol.

During the reaction, the reaction mixture is diluted portionwise to a 40% solution with 315 parts of DMF, 894 parts of toluene and 179 parts of MEK. The desired viscosity is reached after the addition of a further 25 parts of 4,4'-diisocyanatodiphenylmethane. The reaction is stopped by the addition of 15 parts of butanone oxime. The isocyanate content of the solution is less than 0.1%. A viscosity stable solution having a viscosity of 30,000 mPas/23° C. which remains unchanged in storage is obtained.

EXAMPLE 4

900 parts (1.0 mol) of a polyester of adipic acid and butanediol-1,4 having an average molecular weight of 900 are reacted with 87 parts (0.5 mol) of tolylene diisocyanate (65% 2,4-isomer, 35% 2,6-isomer) to form a prepolymer. The OH-terminated prepolymer is reacted with 93 parts (1.5 mol) of 1,2-ethanediol and 500 parts (2.0 mol) of 4,4'-diisocyanatodiphenylmethane in 2054 parts of DMF/MEK (1:1) to produce a polyurethane solution. When a viscosity of about 18,000 mPas at 80° C. has been reached, the reaction is stopped by the addition of 8 parts of butanone oxime. A 35% solution having a viscosity of 50,000 mPas/23° C. is obtained; this viscosity remains unchanged during several weeks storage.

EXAMPLE 5

1700 parts (1.0 mol) of a hydroxyl polyester of adipic acid, hexandediol-1,6 and neopentyl glycol (65:35 molar ratio) having an average molecular weight of 1700 are reacted with a mixture of 333 parts (1.5 mol) of isophorone diisocyanate and 84 parts (0.5 mol) of hexamethylenediisocyanate in 2146 parts of DMF which is added portionwise with increasing viscosity. The mixture is reacted with 29 parts (0.9 mol) of hydrazine as chain lengthening agent. When the 50% solution has reached a viscosity of 18,000 mPas at 80° C. (isocyanate content of the solution <0.1%), the reaction is stopped by stirring in 12 parts of butanone oxime. A 50% polyurethane solution having a viscosity of 50,000 mPas/23° C. which remains unchanged in storage is obtained.

EXAMPLE 6

In this example, a polyurethane solution is stabilized with butanone oxime and with butanol, the butanol being used in an even greater excess.

2250 parts (1.0 mol) of the same polyester as in Examples 1 and 2 and 216 parts (2.4 mol) of 1,4-butanediol in 6158 parts of DMF/toluene (3:2) are reacted with 851 parts (3.4 mol) of 4,4'-diisocyanatodiphenylmethane at 80° C. The viscosity of the resulting solution is increased by subsequent chain lengthening with the addition of 48 parts of 4,4'-diisocyanatodiphenylmethane, and the solution is divided into four equal portions.

The polyaddition reaction is stopped simultaneously in portions 6/1 and 6/2 by the addition of, in the first case, 6 parts of butanone oxime (6/1) and, in the second case, 50 parts of n-butanol (6/2).

Portions 6/3 and 6/4 are left to react and 6 parts of butanone oxime (6/3) and 10 parts of butanol (6/4) are added after 6 hours at 80° C.

The resulting viscosities are summarized in the table below:

| Portion | Viscosity (initial) [mPas/23° C.] | Viscosity (after 5 days) [mPas/23° C.] |
| --- | --- | --- |
| 6/1 | 36,000 | 36,000 |
| 6/2 | 35,000 | 60,000 |
| 6/3 | 140,000 | 142,000 |
| 6/4 | 135,000 | 180,000 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preration of predominantly linear polyurethanes which comprises:
   (a) reacting
   (A) an organic diisocyanate or diisocyanate mixture optionally containing small portions of a triisocyanate, with
   (B) one or more polyhydroxyl compounds which are predominantly bifunctional and generally have molecular weights of from about 400 to 5000 and
   (C) optionally one or more chain lengthening agents having at least two isocyanate reactive hydrogen atoms and molecular weights of from about 32 to 399,
   wherein the proportion of isocyanate groups to the number of isocyanate-reactive hydrogen atoms is in the range of from about 0.9:1 to 1:0.9, and
   (b) when the isocyanate content is less than about 0.4% by weight and the required viscosity has been reached, adding a monofunctional, low molecular weight oxime having a molecular weight from about 73 to 325 to the reaction mixture as monofunctional chain breaking agent in a quantity equivalent to or in excess of the equivalents of unreacted isocyanate groups.

2. The process of claim 1 wherein the low molecular weight oxime has a molecular weight of about 73 to 141.

3. The process of claim 1 wherein the low molecular weight oxime is butanone oxime.

4. The process of claim 1 which comprises adding the low molecular weight oxime when the isocyanate content is less than about 0.25% by weight.

5. The process of claim 3 which comprises adding the low molecular weight oxime when the isocyanate content is less than about 0.25% by weight.

* * * * *